(12) United States Patent
Ueda et al.

(10) Patent No.: US 6,262,827 B1
(45) Date of Patent: Jul. 17, 2001

(54) GALVANO-MIRROR

(75) Inventors: Satoshi Ueda; Hisao Okuda, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/559,093

(22) Filed: Apr. 27, 2000

(30) Foreign Application Priority Data

Jun. 29, 1999 (JP) .................................................. 11-183253

(51) Int. Cl.$^7$ .................................................. G02B 26/08
(52) U.S. Cl. .................... 359/224; 359/223; 359/198; 359/199
(58) Field of Search .................... 359/198, 199, 359/223, 224

(56) References Cited

U.S. PATENT DOCUMENTS 5,629,790 * 5/1997 Neukermans et al. ............... 359/198
6,075,639 * 6/2000 Kino et al. ........................... 359/224

FOREIGN PATENT DOCUMENTS 5-119280 5/1993 (JP).
9-146034 6/1997 (JP).

OTHER PUBLICATIONS

IBM J. Res. Develop.—vol. 24, No. 5, Sep. 1980.

* cited by examiner

*Primary Examiner*—James Phan
(74) *Attorney, Agent, or Firm*—Armstrong, Westerman, Hattori, McLeland & Naughton LLP

(57) ABSTRACT

A galvano-mirror includes a mirror substrate provided with a frame, a mirror element and torsion bars rotatably connecting the mirror element to the frame. The mirror element is provided with a body having an obverse surface and a reverse surface. A mirror surface is formed on the obverse surface, while first electrodes are formed on the reverse surface. The galvano-mirror also includes an electrode substrate provided with second electrodes arranged in facing relation to the first electrodes. The electrode substrate is formed with a through-hole extending through a thickness thereof and facing the mirror element.

20 Claims, 8 Drawing Sheets

GALVANO-MIRROR

BACKGROUND OF THE INVENTION

1. Field of the Invention

The present invention relates to an electrostatically driven galvano-mirror used in e.g. an optical disk apparatus for controlling the direction of light emission.

2. Description of the Related Art

A typical electrostatically driven galvano-mirror is disclosed in e.g. "Silicon Torsional Scanning Mirror (IBM J. RES. and DEVELOP., Vol. 24, No. 5, September 1980)". As shown in FIGS. 12 and 13 of the accompanying drawings, the conventional galvano-mirror is provided with a lower substrate 100 and an upper substrate 102 bonded to the lower substrate 100. The upper substrate 102 includes a frame 104, a mirror element 106 (formed with a mirror surface 106a), and two torsion bars 108 connecting the mirror element 106 to the frame 104.

With such an arrangement, the mirror element 106 is deflected in a torsional movement about the torsion bars 108 upon application of external forces to the mirror element 106. The mirror element 106 has a bottom surface on which a pair of first electrodes 110a, 110b are formed. Correspondingly, the lower substrate 100 is provided with a pair of second electrodes 112a and 112b facing the first electrodes 110a and 110b, respectively. The lower substrate 100 is formed integrally with a ridge 100a contacting with the mirror element 106. The ridge 100a extends along the aligned axes of the torsion bars 108.

When voltage is applied across the first electrode 110a and the second electrode 112a, the mirror element 106 is rotated counterclockwise in FIG. 13 by electrostatic force. When voltage is applied across the other first electrode 110b and the other second electrode 112b, the mirror element 106 is rotated clockwise. Such electrostatic force is proportional to the area of the respective electrodes. Thus, for actuating the mirror element 106 with a low voltage, the area of the first electrodes 110a, 110b needs to be large, which may cause the electrodes 110a, 110b to cover almost the entirety of the lower surface of the mirror element 106. The size of the second electrodes 112a, 112b is determined in correspondence to the size of the first electrodes 110a, 110b.

In the conventional galvano-mirror described above, the mirror element 106 in motion tends to be subject to unfavorable damping due to the viscosity of the air present between the mirror element 106 and the lower substrate 100. Consequently, it is difficult to properly control the movement of the mirror element 106.

For reducing such viscous air-damping, the lower substrate 100 may be formed with a plurality of grooves facing the mirror element 106, as taught in JP-A-9(1997)-146034 for example. However, the additional processing of such grooves may make the fabrication procedures of the galvano-mirror disadvantageously complex. As a result, the production efficiency is lowered, while the cost is unduly increased.

Another problem of the conventional galvano-mirror of FIGS. 12 and 13 is that the mirror element 106 may be displaced sideways upon application of voltage across the first electrode 110a and the second electrode 112a (or across the other first electrode 110b and the other second electrode 112b). The mirror element 106 is moved in this manner since the electrostatic force generated by the voltage application has a horizontal component acting on the mirror element 106. Such sideways displacement may render the posture of the mirror element 106 unpredictable. Thus, desired control accuracy in operating the mirror element 106 may be unobtainable.

The above-described sideways displacement of the mirror element 106 may be reduced by attaching the mirror element 106 to the ridge 100a in a deflectable manner, as taught by JP-A-5(1993)-119280. Specifically, the bottom surface of the mirror element 106 may be formed with a groove into which the top of the ridge 100a is received. The drawback of this arrangement is that the production cost tends to be increased because it is necessary to precisely form the groove in the mirror element 106 at the right position. The ridge 100a also needs to be formed and positioned accurately.

SUMMARY OF THE INVENTION

The present invention has been proposed under the circumstances described above, and its object is to provide a galvano-mirror in which the occurrence of viscous air-damping is reliably prevented. The galvano-mirror is also advantageous in minimizing an increase in production cost.

Another object of the present invention is to provide a galvano-mirror in which the sideways displacement of the mirror element is reliably prevented by taking inexpensive countermeasures.

According to a first aspect of the present invention, there is provided a galvano-mirror comprising:

a mirror substrate including a frame, a mirror element and torsion bars rotatably connecting the mirror element to the frame, the mirror element being provided with a body having an obverse surface and a reverse surface, the mirror element being also provided with a mirror surface formed on the obverse surface and first electrodes formed on the reverse surface; and an electrode substrate provided with second electrodes arranged in facing relation to the first electrodes;

wherein the electrode substrate is formed with a through-hole extending through a thickness thereof and facing the mirror element.

With such an arrangement, the through-hole of the electrode substrate permits freer flow of the air which would otherwise be trapped between the mirror element and the electrode substrate. Thus, the problem of the air-damping is advantageously overcome.

In a preferred embodiment, the second electrodes are arranged adjacent to the through-hole.

Preferably, the galvano-mirror may further comprise stoppers for preventing the first electrodes from contacting with the second electrodes.

According to a second aspect of the present invention, there is provided a galvano-mirror comprising:

a mirror substrate including a frame, a mirror element and torsion bars rotatably connecting the mirror element to the frame, the mirror element being provided with a body having an obverse surface and a reverse surface, the mirror element being also provided with a mirror surface formed on the obverse surface and first electrodes formed on the reverse surface;

an electrode substrate formed with second electrodes facing the first electrodes;

third electrodes formed on the obverse surface of the mirror element; and a supporting structure provided with fourth electrodes facing the third electrodes.

With such an arrangement, unfavorable sideways displacement of the mirror element is effectively prevented by canceling out the opposite components of the electrostatic forces acting on the mirror element. In this manner, there is no need to accurately process and position a ridge member to be formed in the electrode substrate for holding the mirror element in place.

In the galvano-mirror of the second aspect again, the electrode substrate may be formed with a through-hole extending through a thickness thereof and facing the mirror element.

The above-mentioned through-hole may be generally symmetrical with respect to axes of the torsion bars. Further, the second electrodes may comprise two conductive layers which are arranged close to the through-hole and symmetrical with respect to the axes of the torsion bars.

Specifically, the through-hole may be rectangular, elliptic, circular or the like.

Preferably, the first electrodes, the second electrodes, the third electrodes and the fourth electrodes may comprise two conductive layers, respectively, which are arranged symmetrically with respect to axes of the torsion bars. This means that the first electrodes may comprise two conductive layers symmetrical with respect to the axes of the torsion bars, the second electrodes may also comprise other two conductive layer symmetrical with respect to the axes of the torsion bars, and so on.

In a preferred embodiment, the two conductive layers of the first electrodes may be electrically connected to each other, and also the two conductive layers of the third electrodes may be electrically connected to each other. In this case, required voltage may be simultaneously applied both to one of the two conductive layers of the second electrodes and to one of the two conductive layers of the fourth electrodes for generating a torque in the mirror element.

Alternatively, the two conductive layers of the second electrodes may be electrically connected to each other, and the two conductive layers of the fourth electrodes may be electrically connected to each other. In this case, required voltage may be simultaneously applied both to one of the two conductive layers of the first electrodes and to one of the two conductive layers of the third electrodes for generating a torque in the mirror element.

Preferably, an electrostatic force generated by voltage application across the first and the second electrodes may have a first component parallel to the mirror element, and an electrostatic force generated by voltage application across the third and the fourth electrodes may have a second component parallel to the mirror element. For preventing the sideways displacement of the mirror element, the first component may be cancelled out by the second component.

In a preferred embodiment, the supporting structure may have a one-piece frame-like configuration.

Preferably, the supporting structure may be formed with an opening for allowing passage of light.

In another preferred embodiment, the supporting structure may comprise a pair of supporting members each of which has an L-shaped cross section.

Preferably, the galvano-mirror may further comprise stoppers for restricting rotation of the mirror element to prevent the first electrodes from contacting with the second electrodes and to prevent the third electrodes from contacting with the fourth electrodes.

Preferably, the stoppers may protrude from the electrode substrate.

In a preferred embodiment, the first and the third electrodes may be electrically connected to each other. The first and the third electrodes may be formed integral to each other.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
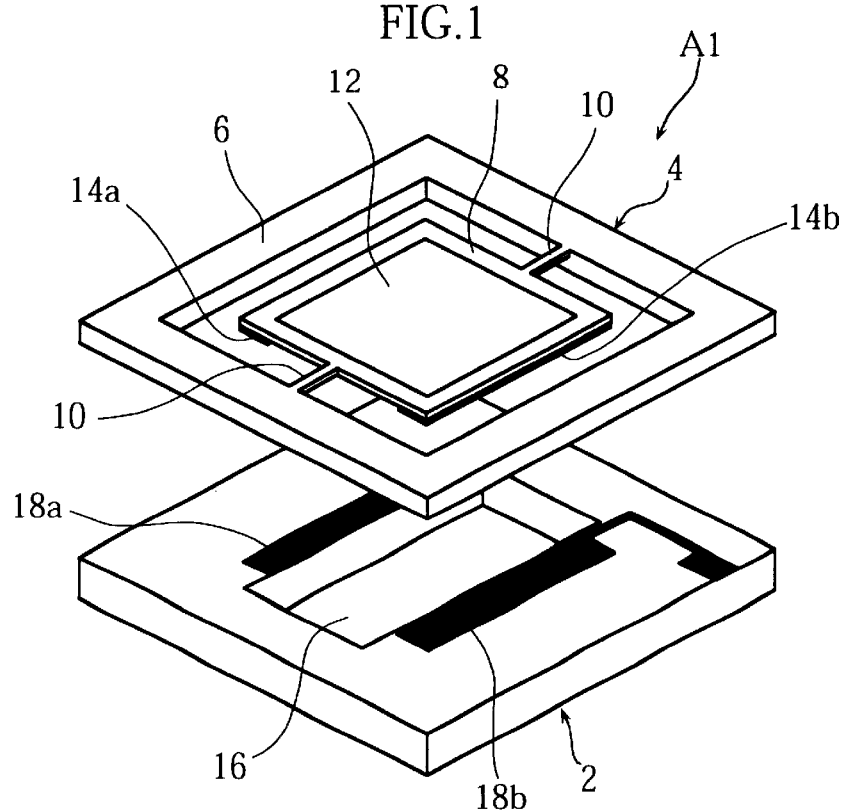
FIG. 1 is an exploded perspective view showing a galvano-mirror according to a first embodiment of the present invention.
Figure 2A:
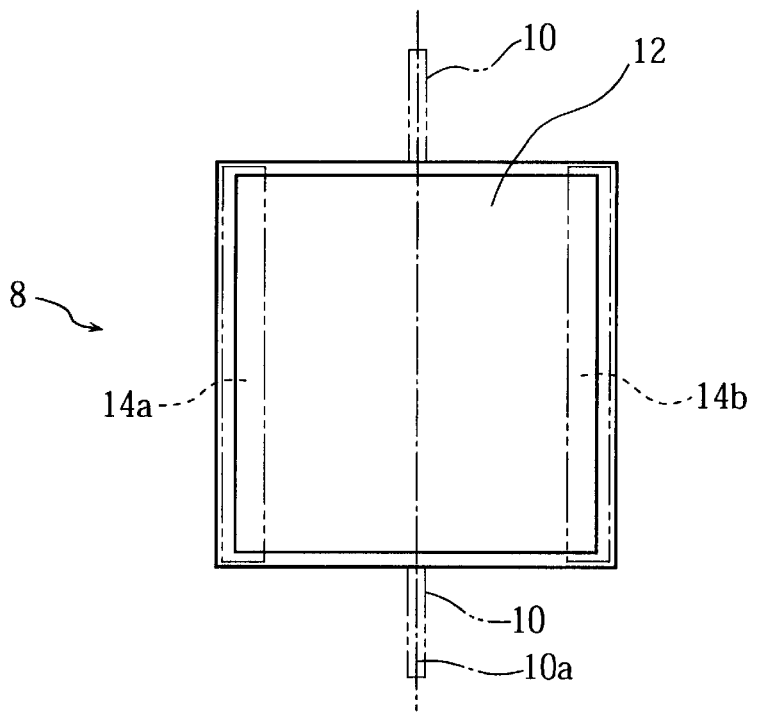
FIG. 2A is a plan view showing a mirror element used for the galvano-mirror of FIG. 1.
Figure 2B:
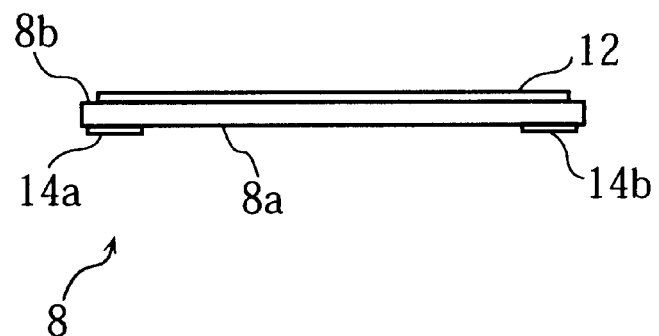
FIG. 2B is a front view showing the mirror element of FIG. 2A.

Reference is first made to FIGS. 1, 2A and 2B illustrating a galvano-mirror A1 according to a first embodiment of the present invention. As best shown in FIG. 1, the mirror A1 includes a lower substrate (electrode substrate) 2 and an upper substrate (mirror substrate) 4 bonded to the lower substrate 2. The upper substrate 4, which may be made of e.g. silicon or aluminum, is provided with a rectangular supporting frame 6, a rectangular mirror element 8, and two torsion bars 10 connecting the mirror element 8 to the frame 6. The axes 10a of the respective torsion bars 10 are aligned (see FIG. 2A). The upper substrate 4 is symmetrical with respect to the axes 10a of the torsion bars 10. With such an arrangement, the mirror element 8 is deflectable in a torsional movement (or rotatable) about the torsion bars 10 within a range of predetermined angles.

As shown in FIG. 2B, the mirror element 8 has a planar body provided with a lower (or reverse) surface 8a and an upper (or obverse) surface 8b. A highly reflective layer or mirror surface 12 is formed on the upper surface 8b (see also FIG. 1). Two electrodes (first electrodes) 14a and 14b are formed on the lower surface 8a of the mirror element 8. As best shown in FIG. 2A, the first electrodes 14a, 14b have the same rectangular configuration extending in parallel to the torsion bars 10.

As shown in FIG. 1, the lower substrate 2 is formed with a rectangular through-hole 16 facing the mirror element 8. The through-hole 16 is symmetrical with respect to the axes 10a of the torsion bars 10. Further, the lower substrate 2 is provided with two electrodes (second electrodes) 18a and 18b flanking the through-hole 16. The second electrodes 18a, 18b have substantially the same configuration and are arranged symmetrically with respect to the axes 10a of the torsion bars 10. The second electrode 18a faces the first electrode 14a, while the other second electrode 18b faces the other first electrode 14b.

The first electrodes 14a, 14b are electrically connected to each other and grounded in common. The second electrodes 18a, 18b are electrically insulated from each other and separately connected to a controller (not shown). Though not illustrated, the first and the second electrodes are coated with insulating layers.

As shown in FIG. 2A or 2B, the mirror surface 12 covers the entirety of the upper surface 8b of the mirror element 8 except a narrow, marginal region thereof. The first electrodes 14a, 14b, which are formed on the bottom surface 8a of the mirror element 8, are spaced from each other and located near opposite edges of the bottom surface 8a. Thus, the first electrodes 14a, 14b extend in parallel to the axes 10a of the torsion bars 10 and are arranged symmetrically with respect to the axes 10a.

In the illustrated embodiment, the mirror element 8 has the same length and width (2 mm) and a thickness of 300 $\mu$m. The torsion bars 10 have a length of 500 $\mu$m, a width of 15 $\mu$m and a thickness of 50 $\mu$m. When the mirror element 8 is in equilibrium (i.e., not deflected about the torsion bars 10), the distance between the mirror element 8 and the lower substrate 2 is 10 $\mu$m. The first electrodes 14a, 14b have a length of e.g. 2 mm and a width of 150 $\mu$m. Under control, the mirror element 8 is caused to rotate about the axes of the torsion bars 10 through ±0.1 degrees.

The operation of the galvano-mirror A1 will now be described. As stated above, the first electrodes 14a, 14b are grounded. Thus, when positive or negative voltage is applied to e.g. the second electrode 18a, the first and the second electrodes 14a and 18a are electrostatically attracted to each other. Thus, the mirror element 8 is rotated counterclockwise (as viewed in FIG. 2B) about the torsion bars 10. The angle of rotation of the mirror element 8 is determined by the relation between the external torque acting on the mirror element 8 and the resisting force of the torsion bars 10. Therefore, when the voltage applied to the second electrode 18a becomes higher, the rotational angle of the mirror element 8 will be greater. It follows that the rotational angle of the mirror element 8 is controlled by varying the voltage applied to the second electrode 18a.

As readily understood, it is possible to rotate the mirror element 8 clockwise about the torsion bars 10 by applying positive or negative voltage to the other second electrode 18b.

As stated above, the distance between the mirror element 8 and the lower substrate 2 is small (10 $\mu$m). Thus, without taking suitable countermeasures, the rotation of the mirror element 8 would be unduly damped due to the viscosity of the air to be compressed or expanded between the mirror element 8 and the lower substrate 2. In such an instance, it is difficult or even impossible to control the rotational movement of the mirror element 8 with appropriate accuracy and quick response. The adverse effect of the damping may become more conspicuous when the mirror element 8 needs to be operated at higher frequencies. The same problem may result when the galvano-mirror A1 would be set in an atmosphere of a gas other than the air.

According to the illustrated embodiment of the present invention, however, the occurrence of damping is reliably prevented due to the through-hole 16 formed in the lower substrate 2. This is because the through-hole 16 permits freer flow of air which would otherwise be trapped between the mirror element 8 and the lower substrate 2. Preferably, the depth of the through-hole 16 (i.e., the thickness of the lower substrate 2) is sufficiently greater than the distance between the mirror element 8 and the lower substrate 2. In this manner, undesirable damping of the mirror element 8 is effectively prevented, even if the through-hole 16 is closed from below by e.g. a supporting member on which the galvano-mirror A1 is mounted.

Due to the presence of the through-hole 16, the second electrodes 18a, 18b formed on the lower substrate 2 may need to be made smaller than when such a through-hole is not provided. The following section discusses how the rotational movement of the mirror element 8 is affected by the size reduction in the second electrodes 18a, 18b.

In general, when two flat electrodes are arranged in parallel to each other, the electrostatic attraction F acting between them is given by:

$$F = (1/2)\in A(V/D)^2 \quad (1)$$

where $\in$ is the dielectric constant of the medium between the two electrodes, A is the area of each electrode, V is the voltage applied to the electrodes and D is the distance between the electrodes. The equation (1) shows that when the area (A) of an electrode is reduced, the electrostatic attraction F acting on the electrode is reduced proportionally.

It is also known that when an external force F is perpendicularly applied to a pivotable bar, the torque T to be generated in the bar is given by:

$$T = FL \quad (2)$$

where L is the distance between the pivotal center and the action point of the external force F.

As seen from the equation (2), the torque T exerted on the bar becomes greater as the distance L increases.

According to the above equations (1) and (2), the following results are obtained.

In the first embodiment, the presence of the through-hole 16 renders the second electrodes 18a, 18b comparatively small, and accordingly the first electrodes 14a, 14b are also made small. Consequently, as seen from the above equation (1), the dielectric force generated between the first electrode 14a (or 14b) and the second electrode 18a (or 18b) tends to be smaller than when the through-hole 16 is not provided. Thus, the torque exerted on the mirror element 8 will be smaller.

Figure 12:
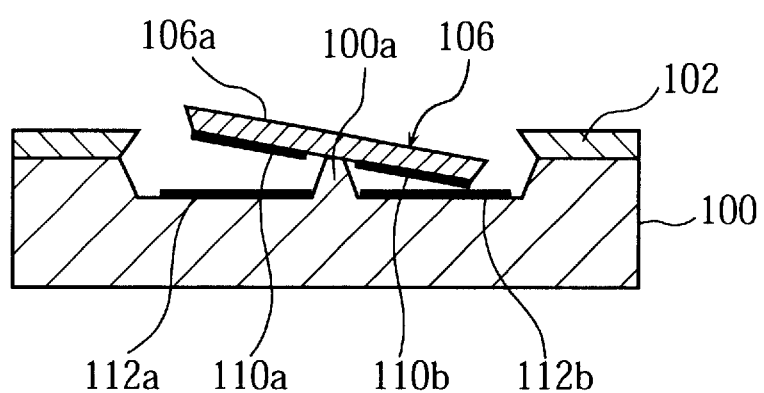
FIG. 12 is a sectional view showing the conventional galvano-mirror of FIG. 11.

However, in the first embodiment, the above torque reduction is not so large as to be detrimental to proper operation of the mirror element 8. This is because the omitted parts of the second electrodes 18a, 18b are closer to the axes 10a of the torsion bars 10 than the actually provided parts shown in FIG. 1. Therefore, an additional torque which would be applied to the mirror element 8 without the through-hole 16 is advantageously small (equation (2)). In the first embodiment, specifically, the torque reduction is only less than 50%, while the area of each first electrode 14a, 14b is reduced to 15%, as compared to the conventional galvano-mirror shown in FIG. 12.

Figure 3:
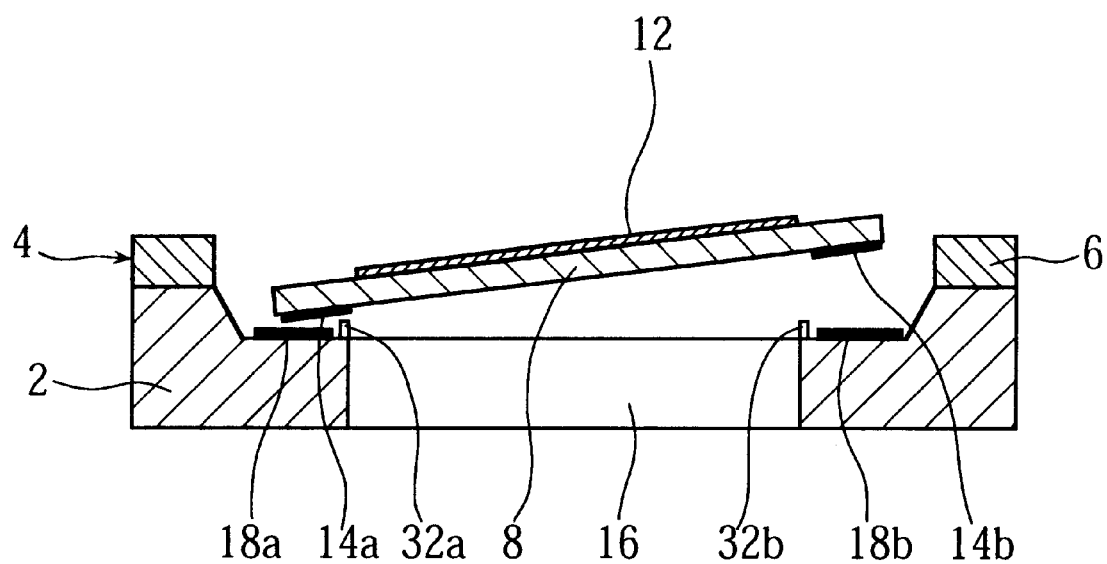
FIG. 3 is a sectional view showing a modified version of the galvano-mirror of the first embodiment.

FIG. 3 shows a modified version of the galvano-mirror A1. The modified galvano-mirror is identical in arrangement to the galvano-mirror A1 except for stoppers 32a and 32b provided besides the second electrodes 18a and 18b, respectively. With such an arrangement, collisions between the first electrode 14a and the second electrode 18a or between the other first electrode 14b and the other second electrode 18b are reliably prevented from occurring.

Figure 4:
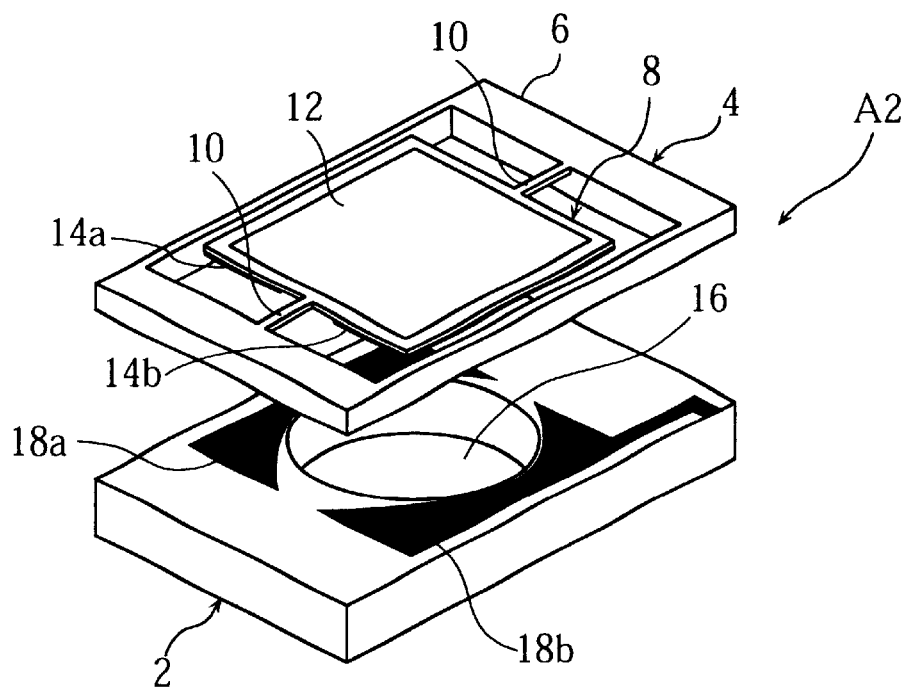
FIG. 4 is an exploded perspective view showing a galvano-mirror according to a second embodiment of the present invention.

FIG. 4 shows a galvano-mirror A2 according to a second embodiment of the present invention. In this figure, elements like or similar to those of the first embodiment are designated by the same reference numerals or signs as used for the first embodiment.

As illustrated in FIG. 4, the galvano-mirror A2 is basically similar to the galvano-mirror A1 of the first embodiment except for the through-hole 16 formed in the lower substrate 2. According to the second embodiment, the through-hole 16 is circular. In this way, the second electrodes 18a, 18b are made larger without increasing the size of the lower substrate 2. Thus, it it possible to increase the torque acting on the mirror element 8 or reduce the voltage applied to the second electrodes 18a, 18b, without increasing the overall size of the galvano-mirror A2. Instead of the circular cross section, the through-hole 16 may have an elliptic or other oval cross section.

Figure 5:
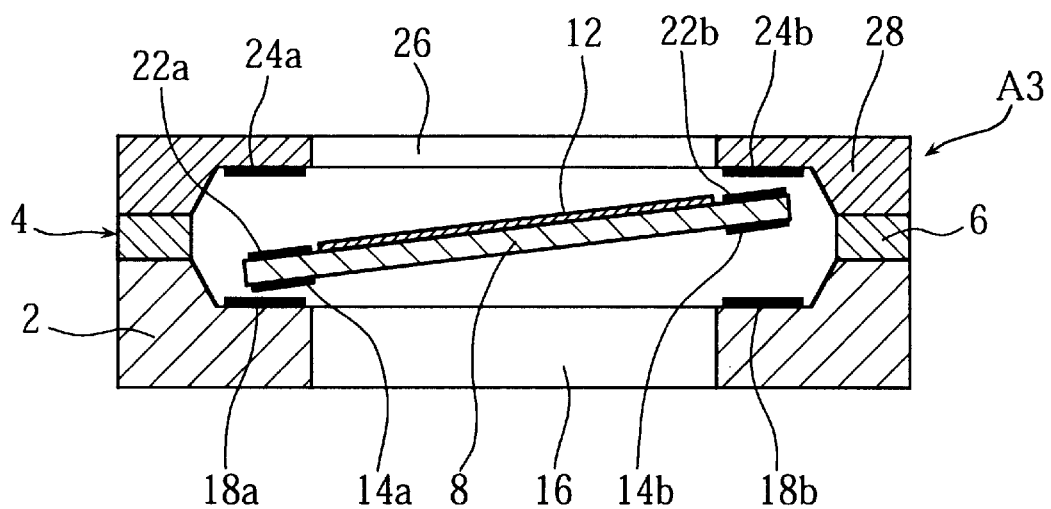
FIG. 5 is a sectional view showing a galvano-mirror according to a third embodiment of the present invention.

FIG. 5 shows, in section, a galvano-mirror A3 according to a third embodiment of the present invention. In this embodiment, third electrodes 22a, 22b are formed on the upper surface of the mirror element 8 in a manner such that the third electrodes 22a and 22b are arranged opposite to the first electrodes 14a and 14b, respectively.

The galvano-mirror A3 includes a supporting structure or top frame 28 mounted on the mirror substrate 4. The top frame 28 has a generally rectangular, one-piece configuration and is formed with an opening 26 for allowing the passage of light traveling toward or away from the mirror surface 12. Fourth electrodes 24a, 24b flanking the opening 26 are formed on the top frame 28. As illustrated, the fourth electrodes 24a and 24b are held in facing relation to the third electrodes 22a and 22b, respectively. The third electrodes 22a, 22b are the same in size as the first electrodes 14a, 14b. The fourth electrodes 24a and 24b are arranged above the second electrodes 18a and 18b, respectively, with the mirror element 8 intervening therebetween.

The two third electrodes 22a, 22b are electrically connected to each other and grounded in common. The fourth electrodes 24a, 24b are electrically insulated from each other, and separately connected to a controller (not shown). The first to fourth electrodes 14a–14b, 18a–18b, 22a–22b and 24a–24b are coated by insulating layers (not shown).

In operation of the galvano-mirror A3, equal voltages are applied to e.g. the first electrode 18a and the fourth electrode 24b. Electrostatic attraction is then generated between the third electrode 22b and the fourth electrode 24b, as well as between the first electrode 14a and the second electrode 18a. The electrostatic attraction (first attraction) acting on the first electrode 14a is equal in strength but opposite in direction to the other electrostatic attraction (second attraction) acting on the third electrode 22b. Thus, the mirror element 8 is rotated counterclockwise (in FIG. 5) about the torsion bars 10 by the torque resulting from the first and the second attractions.

According to the third embodiment, two attractions of the same strength are applied for rotating the mirror element 8, as state above. In this manner, the torque generated in the mirror element 8 is made greater than when only one attraction is applied to the mirror element 8 as in the galvano-mirror A1 of the first embodiment. Specifically, the torque generated in the galvano-mirror A3 may be double the torque generated in the galvano-mirror A1 when the applied voltage is the same for the mirrors A1 and A3.

Hence, for exerting a torque of the same magnitude on the mirror elements 8 of the respective mirrors A1 and A3, a smaller voltage may need to be applied to the mirror A3 as compared to the galvano-mirror A1. Specifically, the voltage applied to the galvano-mirror A3 may be $(1/\sqrt{2})$ times the voltage applied to the galvano-mirror A1.

Alternatively, the first to the fourth electrodes of the galvano-mirror A3 may be smaller in area than the first and the second electrodes of the galvano-mirror A1 for generating the same torque in the mirror elements 8. Accordingly, the galvano-mirror A3 may be rendered smaller than the galvano-mirror A1. In this case, the applied voltage may be the same for the mirrors A1 and A3.

The galvano-mirror A3 is also advantageous in the following respect. For clarifying the additional advantage of the galvano-mirror A3, comparison is made between the galvano-mirror A1 and the galvano-mirror A3 in reference to FIGS. 6 and 7.

Figure 6:
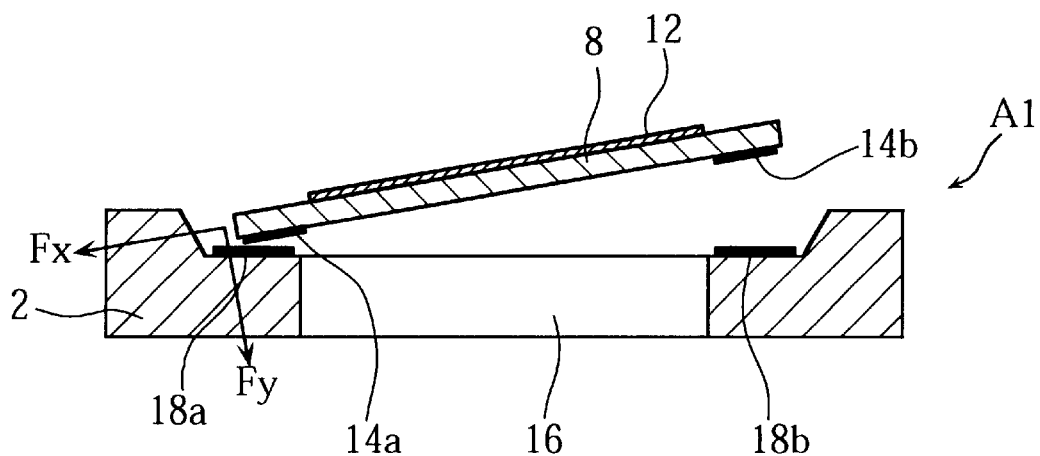
FIG. 6 illustrates how electrostatic force acts on the mirror element of the galvano-mirror of FIG. 1.
Figure 7:
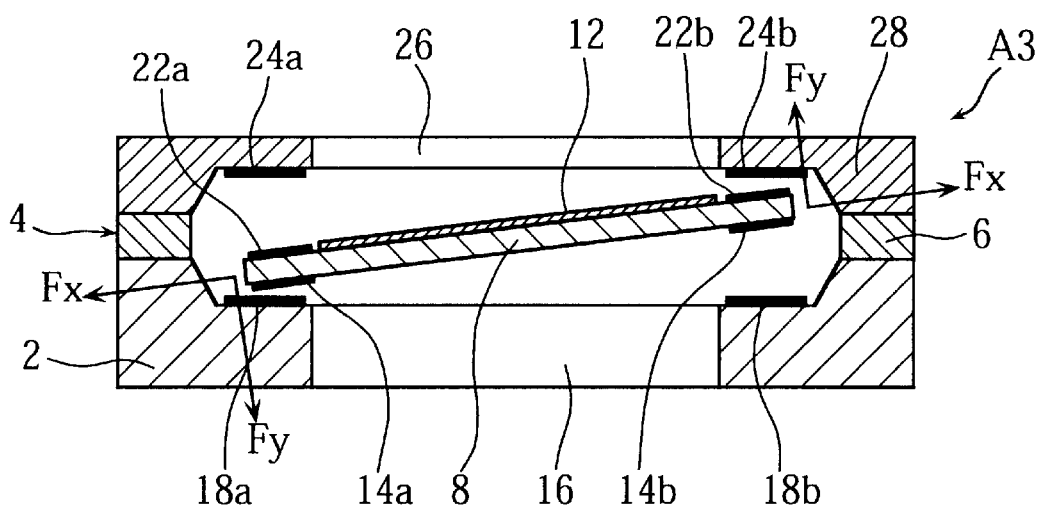
FIG. 7 illustrates how electrostatic force acts on the mirror element of the galvano-mirror of FIG. 5.

When voltage is applied to the second electrode 18a of the mirror A1, the mirror element 8 is rotated counterclockwise about the torsion bars 10, as shown in FIG. 6. In this state, the electrostatic force acting on the left edge of the mirror element 8 has an Fx-component parallel to the mirror element 8 and an Fy-component perpendicular to the Fx-component. Because of the Fx-component, the mirror element 8 of the mirror A1 may be unduly moved to the left.

According to the third embodiment, on the other hand, electrostatic forces will act on both the left and the right edges of the mirror element 8 upon voltage application. As seen from FIG. 7, the right and left Fx-components of the respective electrostatic forces are cancelled out. Thus, the mirror element 8 of the galvano-mirror A3 does not undergo sideways displacement. Clearly, the same advantage is obtainable when voltage is applied to the second electrode 18b and the fourth electrode 24a.

FIGS. 8A through 8K show fabrication procedures of the mirror substrate (upper substrate) 4 of the galvano-mirror A3 shown in FIG. 5.

Figure 8A:
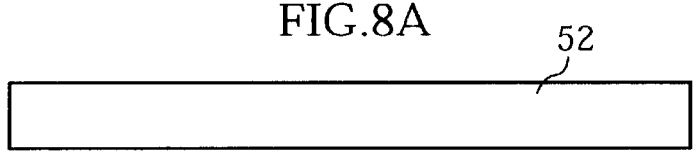
FIGS. 8A–8K illustrate fabrication procedures of an upper substrate (mirror substrate) used in the galvano-mirror of FIG. 5.

First, as shown in FIG. 8A, a wafer 52 made of silicon is prepared.

Figure 8B:
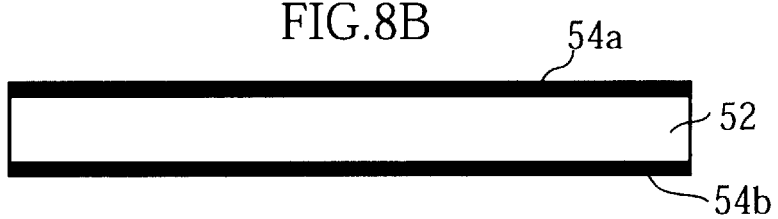

Then, as shown in FIG. 8B, oxide layers 54a, 54b are formed over the upper and the lower surfaces of the wafer 52.

Figure 8C:
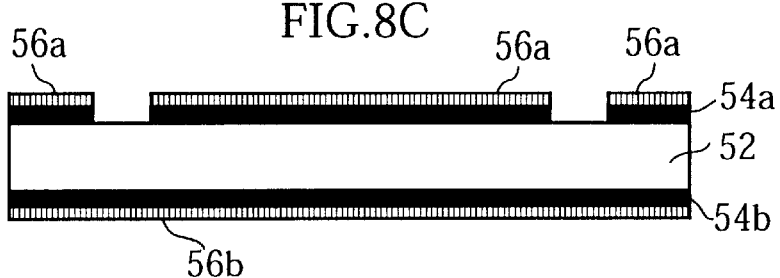

Then, as shown in FIG. 8C, a predetermined pattern of a first photoresist layer 56a is formed on the upper oxide layer 54a, while a second photoresist layer 56b is formed over the entirety of the lower oxide layer 54b. The pattern of the first photoresist layer 56a is configured for making the frame 6 (FIG. 5), the mirror element 8 and the torsion bars (not shown). The exposed portions of the first oxide layer 54a are etched away.

Figure 8D:
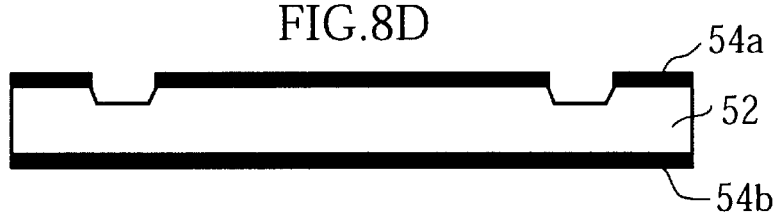

Then, as shown in FIG. 8D, the photoresist layers 56a and 56b are removed. Thereafter, the wafer 52 is subjected to anisotropic etching, so that grooves are formed in the wafer 52 at the positions which are not covered by the upper oxide layer 54a. In the illustrated example, the depth of the grooves may be 50 μm, which is equal to the thickness of the torsion bars.

Figure 8E:
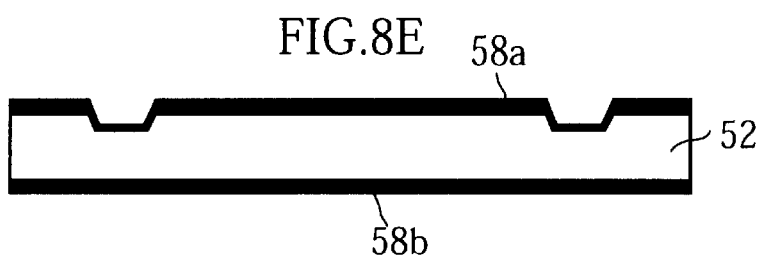

Then, as shown in FIG. 8E, the oxide layers 54a and 54b are stripped, and the wafer 52 is reoxidized to form an upper oxide layer 58a and a lower oxide layer 58b over the upper and the lower surfaces of the wafer 52, respectively.

Figure 8F:
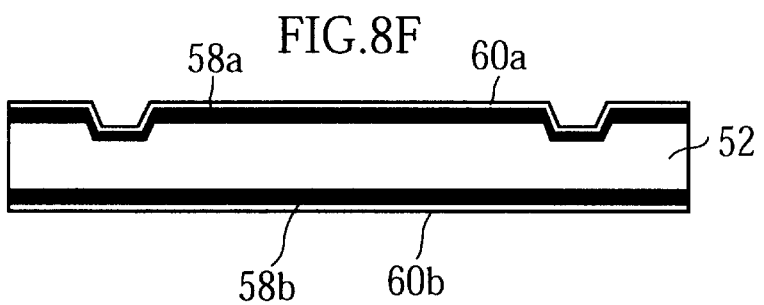

Then, as shown in FIG. 8F, an upper metal layer 60a and a lower metal layer 60b are formed over the upper oxide layer 58a and the lower oxide layer 58b, respectively.

Figure 8G:
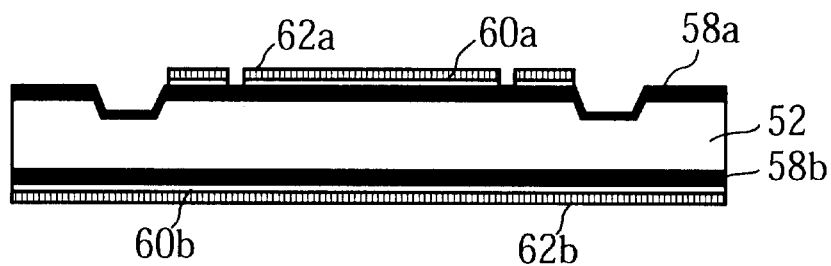

Then, as shown in FIG. 8G, a predetermined pattern of upper photoresist layer 62a is formed on the upper metal layer 60a, while a lower photoresist layer 62b is formed over the entirety of the lower metal layer 60b. The pattern of the upper photoresist layer 62a is configured for making the mirror surface 12 (FIG. 5) and the third electrodes 22a, 22b. The exposed portions of the upper metal layer 60a are etched away. Thereafter, the upper and lower photoresist layers 62a, 62b are removed.

Figure 8H:
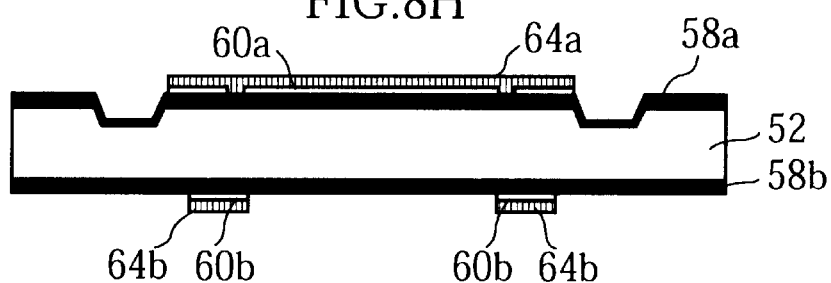

Then, as shown in FIG. 8H, an upper photoresist layer 64a is formed to cover the upper metal layer 60a, while a predetermined pattern of a lower photoresist layer 64b is formed on the lower metal layer 60b. The pattern of the lower photoresist layer 64b is configured for making the first electrodes 14a and 14b (FIG. 5). The exposed portions of the lower metal layer 60b are etched away. Thereafter, the upper and the lower photoresist layers 64a, 64b are removed.

Figure 8I:
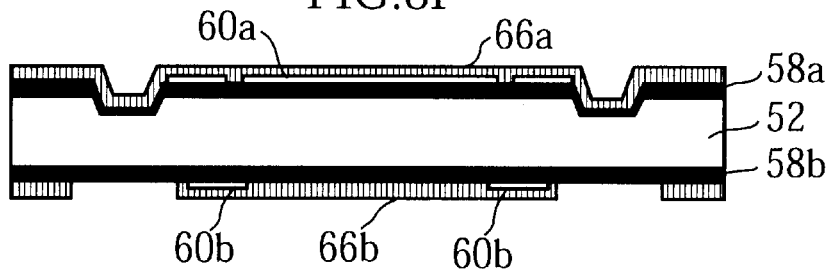

Then, as shown in FIG. 8I, an upper photoresist layer 66a is formed to cover the upper oxide layer 58a and the upper metal layer 60a, while a predetermined pattern of a lower photoresist layer 66b is formed on the lower oxide layer 58b to cover the lower metal layer 60b. The pattern of the lower photoresist layer 66b is configured for making the frame 6 (FIG. 5), the mirror element 8 and the torsion bars (not shown). The exposed portions of the lower oxide layer 58b are etched away. Thereafter, the upper and the lower photoresist layers 66a, 66b are removed.

Figure 8J:
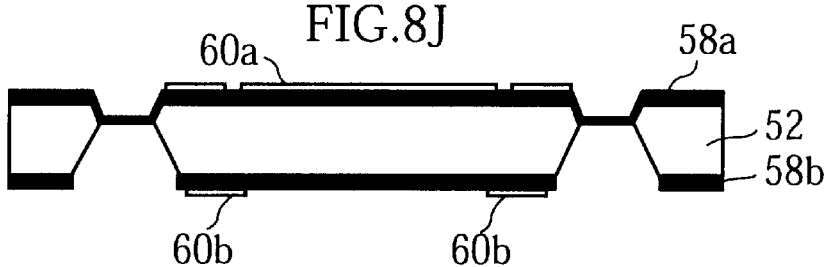

Then, as shown in FIG. 8J, the wafer 52 is subjected to anisotropic etching, so that downwardly open grooves are formed in the wafer 52. As illustrated, the downwardly open grooves are deep enough to reach the upper oxide layer 58a. At the time of this anisotropic etching, a pair of torsion bars (not shown) are formed to connect the inner piece, which corresponds to the mirror element 8, to the outer piece surrounding the inner piece. The outer piece corresponds to the frame 6 (see FIG. 5).

Figure 8K:
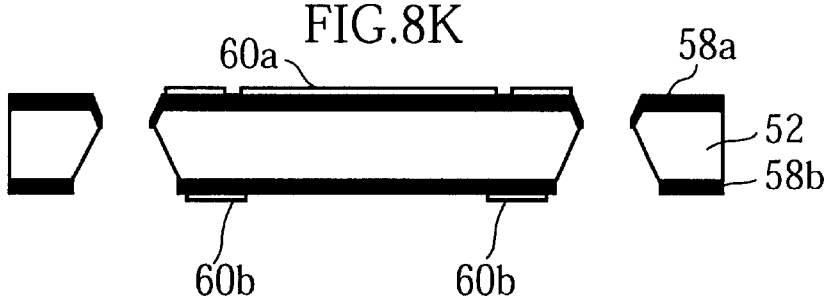

Finally, as shown in FIG. 8K, unnecessary portions of the upper oxide layer 58a are etched away. Thus, the mirror substrate 4 of the galvano-mirror A3 shown in FIG. 5 is obtained. As readily understood, the upper metal layer 60a provides the mirror surface 12 and the third electrodes 22a, 22b, while the lower metal layer 60b provides the first electrodes 14a, 14b.

Figure 9:
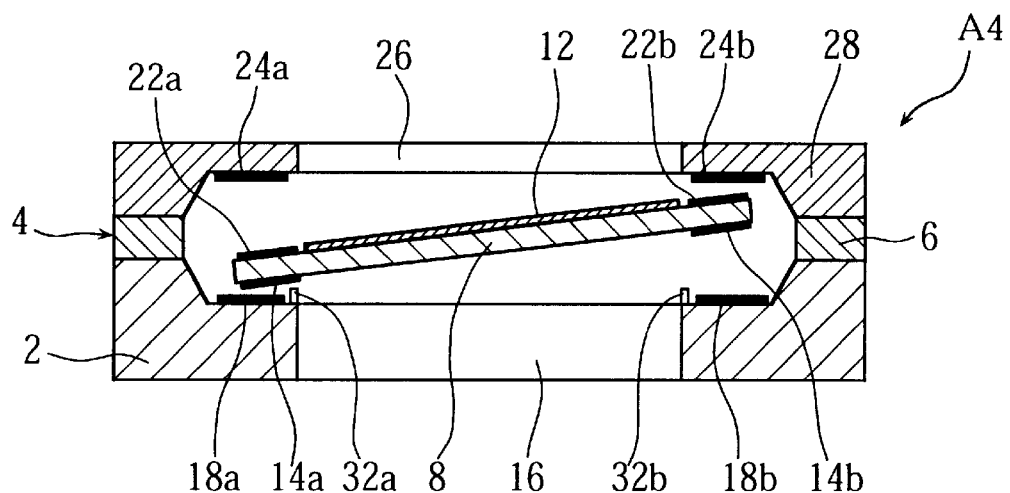
FIG. 9 is a sectional view showing a galvano-mirror according to a fourth embodiment of the present invention.

Reference is now made to FIG. 9 showing, in section, a galvano-mirror A4 according to a fourth embodiment of the present invention. Basically, the galvano-mirror A4 of this embodiment is the same as the galvano-mirror A3 of the third embodiment (FIG. 5) except that first and second stoppers 32a, 32b are integrally formed on the lower substrate 2. Each of the stoppers 32a, 32b projects upward from the lower substrate 2 and is elongated in parallel to the axes of the non-illustrated torsion bars.

With such an arrangement, the first stopper 32a prevents the first electrode 14a from colliding with the second electrode 18a, while also preventing the third electrode 22b from colliding with the fourth electrode 24b. Likewise, the second stopper 32b prevents the first electrode 14b from colliding with the second electrode 18b, while also preventing the third electrode 22a from colliding with the fourth electrode 24a. Thus, the first to the fourth electrodes are protected from mechanical damage or mutual adhesion which would be caused without the stoppers 32a and 32b.

The design of the stoppers 32a, 32b is not limited to the illustrated example. For instance, each of the stoppers 32a, 32b may consist of a plurality of upward projections arranged in a row extending along the axes of the torsion bars. Further, the stoppers 32a, 32b may be provided on the top frame 28 or mirror element 8.

Figure 10:
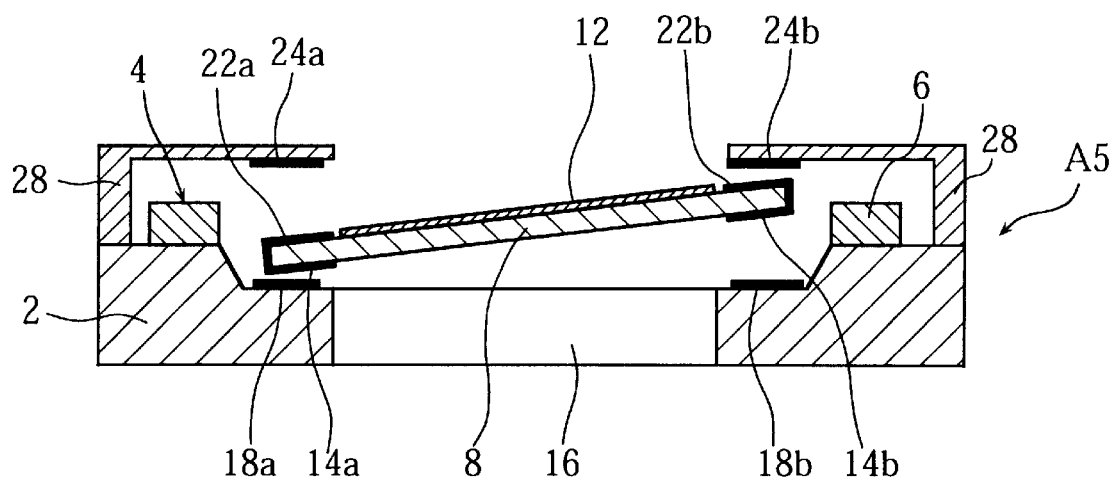
FIG. 10 is a sectional view showing a galvano-mirror according to a fifth embodiment of the present invention.
Figure 11:
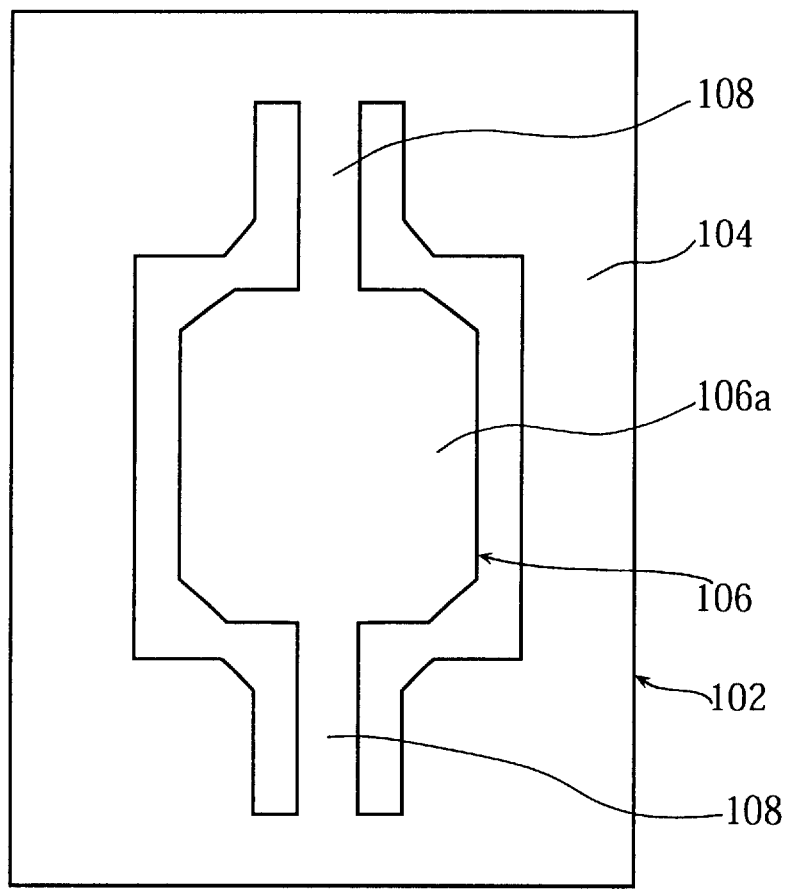
FIG. 11 is a plan view showing a conventional galvano-mirror.

FIG. 10 shows, in section, a galvano-mirror A5 according to a fifth embodiment of the present invention. The galvano-mirror A5 is provided with a supporting structure 28 consisting of two supporting members. As illustrated, each supporting member 28 extends upright from the lower substrate 2 and then extends horizontally. Thus, each supporting member 28 has an L-shaped cross section. In this embodiment, the first electrode 14a is formed integral with the third electrode 22a, while the other first electrode 14b is formed integral with the other third electrode 22b. The supporting members 28 may be mounted on the frame 6 of the mirror substrate 4, not on the lower substrate 2.

In the first to the fifth embodiments A1–A5 described above, only one through-hole 16 is formed in the lower substrate 2. Alternatively, more than one through-hole may be provided in the lower substrate 2. Further, in these embodiments, the first electrodes 14a–14b are grounded and voltage is applied to the second electrodes 18a–18b. Alternatively, the second electrodes 18a–18b may be grounded, while voltage may be applied to the first electrodes 14a–14b.

In the third to the fifth embodiments, the third electrodes 22a–22b are grounded and voltage is applied to the fourth electrodes 24a–24b. Alternatively, the fourth electrodes 24a–24b may be grounded, while voltage may be applied to the third electrodes 22a–22b.

Further, in the third to the fifth embodiments, the two of the first electrodes 14a and 14b are symmetrical to each other with respect to the axes of the torsion bars, and so are the respective pairs of the second to the fourth electrodes 18a–18b, 22a–22b and 24a–24b. In this manner, the Fx-components of the electrostatic forces acting on the mirror element 8 are cancelled out. However, such an arrangement is exemplary, and the present invention is not limited to this. Cancellation of the Fx-components of the electrostatic forces may be achieved by adjusting the gaps between the electrodes. In such an instance, the two of the first electrodes 14a and 14b may differ in configuration and size from each other. This may hold for the second to the fourth electrodes 18a–18b, 22a–22b and 24a–24b.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A galvano-mirror comprising:
    a mirror substrate including a frame, a mirror element and torsion bars rotatably connecting the mirror element to the frame, the mirror element being provided with a body having an obverse surface and a reverse surface, the mirror element being also provided with a mirror surface formed on the obverse surface and first electrodes formed on the reverse surface; and
    an electrode substrate provided with second electrodes arranged in facing relation to the first electrodes;
    wherein the electrode substrate is formed with a through-hole extending through a thickness thereof and facing the mirror element.

2. The galvano-mirror according to claim 1, wherein the second electrodes are arranged adjacent to the through-hole.

3. The galvano-mirror according to claim 1, further comprising stoppers for preventing the first electrodes from contacting with the second electrodes.

4. A galvano-mirror comprising:

a mirror substrate including a frame, a mirror element and torsion bars rotatably connecting the mirror element to the frame, the mirror element being provided with a body having an obverse surface and a reverse surface, the mirror element being also provided with a mirror surface formed on the obverse surface and first electrodes formed on the reverse surface;

an electrode substrate formed with second electrodes facing the first electrodes;

third electrodes formed on the obverse surface of the mirror element; and a supporting structure provided with fourth electrodes facing the third electrodes.

5. The galvano-mirror according to claim 4, wherein the electrode substrate is formed with a through-hole extending through a thickness thereof and facing the mirror element.

6. The galvano-mirror according to claim 5, wherein the through-hole is generally symmetrical with respect to axes of the torsion bars, the second electrodes comprising two conductive layers which are arranged close to the through-hole and symmetrical with respect to the axes of the torsion bars.

7. The galvano-mirror according to claim 6, wherein the through-hole is rectangular.

8. The galvano-mirror according to claim 6, wherein the through-hole is elliptic.

9. The galvano-mirror according to claim 6, wherein the through-hole is circular.

10. The galvano-mirror according to claim 4, wherein the first electrodes, the second electrodes, the third electrodes and the fourth electrodes comprise two conductive layers, respectively, which are arranged symmetrically with respect to axes of the torsion bars.

11. The galvano-mirror according to claim 10, wherein the two conductive layers of the first electrodes are electrically connected to each other, the two conductive layers of the third electrodes being electrically connected to each other, voltage being simultaneously applied both to one of the two conductive layers of the second electrodes and to one of the two conductive layers of the fourth electrodes for generating a torque in the mirror element.

12. The galvano-mirror according to claim 10, wherein the two conductive layers of the second electrodes are electrically connected to each other, the two conductive layers of the fourth electrodes being electrically connected to each other, voltage being simultaneously applied both to one of the two conductive layers of the first electrodes and to one of the two conductive layers of the third electrodes for generating a torque in the mirror element.

13. The galvano-mirror according to claim 4, wherein an electrostatic force generated by voltage application across the first and the second electrodes has a first component parallel to the mirror element, and an electrostatic force generated by voltage application across the third and the fourth electrodes has a second component parallel to the mirror element, the first component being cancelled out by the second component.

14. The galvano-mirror according to claim 4, wherein the supporting structure has a one-piece frame-like configuration.

15. The galvano-mirror according to claim 14, wherein the supporting structure is formed with an opening for allowing passage of light.

16. The galvano-mirror according to claim 4, wherein the supporting structure comprises a pair of supporting members each of which has an L-shaped cross section.

17. The galvano-mirror according to claim 4, further comprising stoppers for restricting rotation of the mirror element to prevent the first electrodes from contacting with the second electrodes and to prevent the third electrodes from contacting with the fourth electrodes.

18. The galvano-mirror according to claim 17, wherein the stoppers protrude from the electrode substrate.

19. The galvano-mirror according to claim 4, wherein the first and the third electrodes are electrically connected to each other.

20. The galvano-mirror according to claim 19, wherein the first and the third electrodes are formed integral to each other.

\* \* \* \* \*